United States Patent [19]
Smith

[11] 3,825,140
[45] July 23, 1974

[54] STOOK INVERTOR
[76] Inventor: Floyd Reid Smith, P.O. Box 154, Hillspring, Alberta, Canada
[22] Filed: Jan. 26, 1973
[21] Appl. No.: 326,683

Related U.S. Application Data
[63] Continuation-in-part of Ser. No. 112,281, Feb. 3, 1971, Pat. No. 3,716,175.

[52] U.S. Cl.................... 214/768, 214/1 Q, 214/6.5
[51] Int. Cl.............................................. B65g 7/00
[58] Field of Search............ 214/1 Q, 1 R, 768, 6 B, 214/6.5

[56] References Cited
UNITED STATES PATENTS
3,716,175  2/1973  Smith................... 214/768

Primary Examiner—Frank E. Werner
Attorney, Agent, or Firm—Stanley G. Ade

[57] ABSTRACT

A triangular stook invertor for picking up a stook consisting of a plurality of bales in triangular formation, and the invertor turns the stook upside down so that it will nest between two adjacent, normally positioned stooks thus enabling a relatively large stook to be built.

6 Claims, 13 Drawing Figures

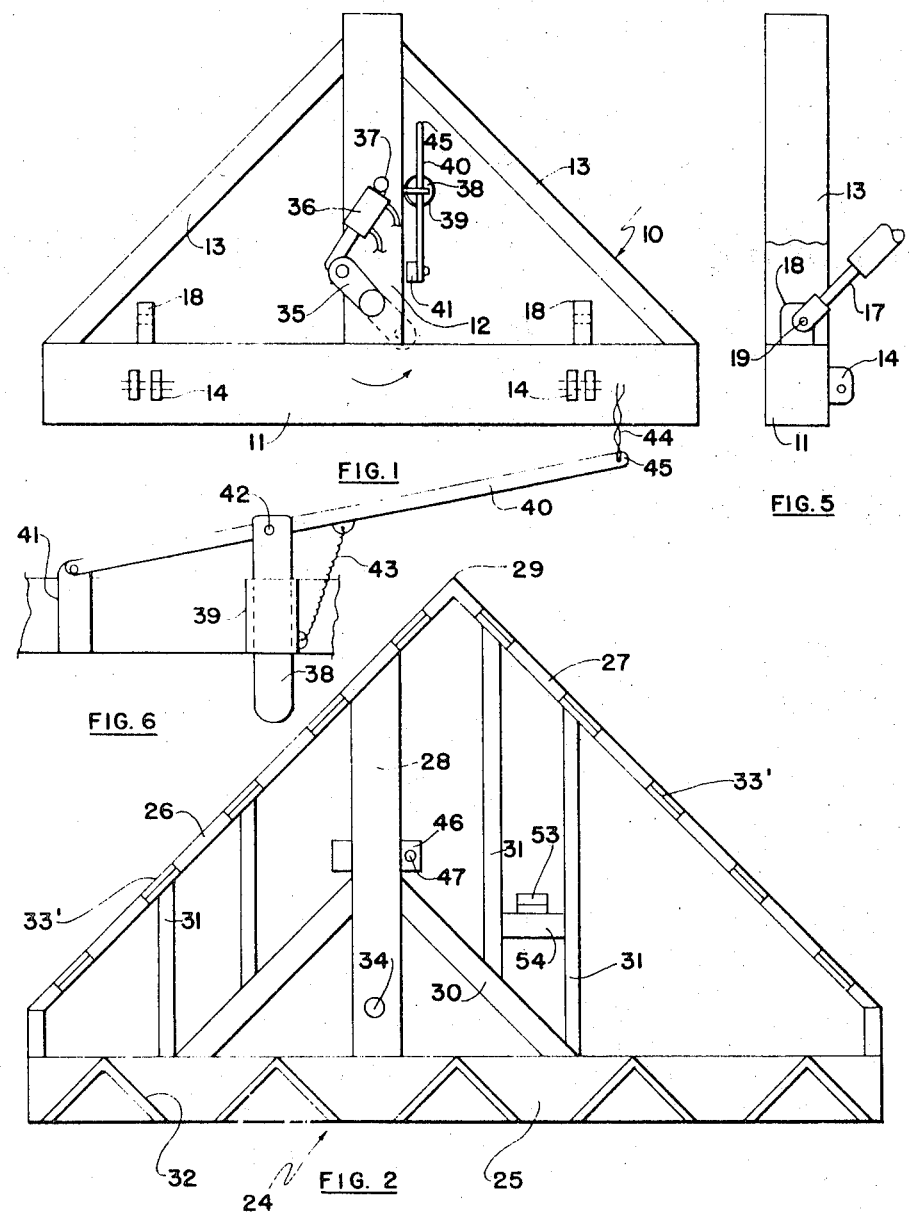

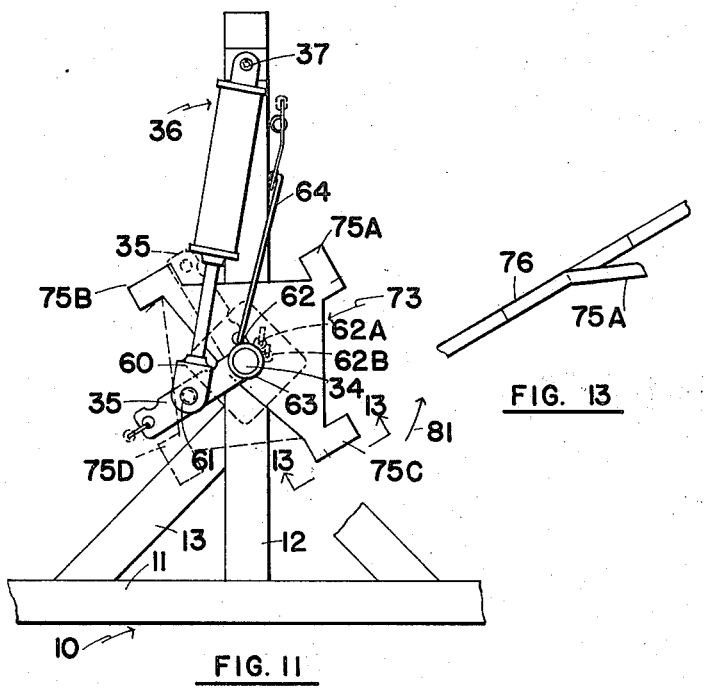
FIG. 11
FIG. 13
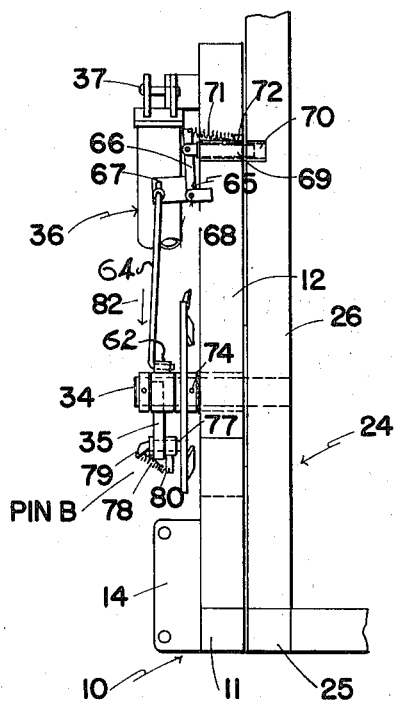
FIG. 12

STOOK INVERTOR

BACKGROUND OF THE INVENTION

This invention relates to new and useful improvements in stook invertor devices and constitutes a continuation-in-part of application Ser. No. 112,281, filed Feb. 3, 1971, now U.S. Pat. No. 3,716,175, dated Feb. 13, 1973.

It is conventional to stack bales of hay in the form of a substantially rectangular stook, said stook containing six, 10 or 15 bales with the ground engaging bales being tipped on edge for air circulation purposes.

It is often desirable to build these stooks up into a relatively large stack, but unless entire stooks can be reversed and nested upside down between adjacent stooks, the size of the stack is severely limited.

SUMMARY OF THE INVENTION

The device hereinafter to be described is adapted to pick up a stook of bales in toto, move it to a location between adjacent stooks and then reverse the entire stook so that it can be nested upside down between the sloping sides of the adjacent stooks.

The principal object and essence of the invention is therefore to provide a device of the character herewithin described which enables a stook of bales to be picked up, moved to the desired location, and then reversed, if desired.

Another object of the invention is to provide a device of the character herewithin described which utilizes the weight of the stook within the device to rotate it to the inverted position thus simplifying the mechanism considerably.

Yet another object of the invention is to provide a device of the character herewithin described which, because it utilizes gravity to invert the stook, is more rapid in operation than a fully powered operating device.

Yet another object of the invention is to provide a device of the character herewithin described which is simple in construction, economical in manufacture, and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

FIG. 1 is a rear elevation of the stationary component per se.

FIG. 2 is a front elevation of the movable component per se.

FIG. 5 is a side elevation of the stationary component, fragmented in part for clarity.

FIG. 6 is an enlarged side elevation of one of the lock pin assemblies.

FIG. 11 is a rear view of the preferred embodiment of the device with the stook carrier removed for clarity.

FIG. 12 is a side elevation of FIG. 11 with the stook carrier shown fragmented.

FIG. 13 is a view along the line 13—13 of FIG. 11.

In the drawings like characters of reference indicate corresponding parts in the different figures.

DETAILED DESCRIPTION

Figure 3:
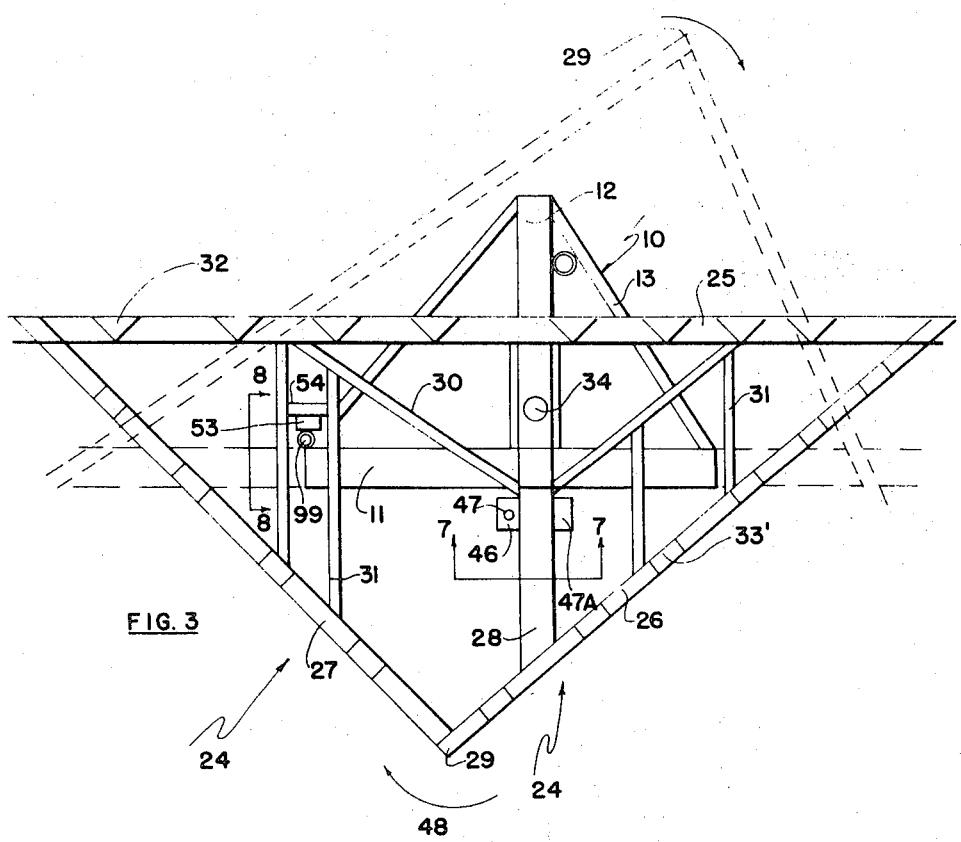
FIG. 3 is a front elevation of the device showing the movable component in the inverted position.
Figure 7:
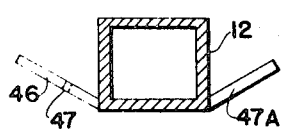
FIG. 7 is an enlarged fragmentary cross sectional view substantially along the lines 7—7 of FIG. 3.

Proceeding therefore to describe the invention in detail, reference character 10 illustrates generally a stationary component consisting of a horizontal beam 11, a vertical support 12 extending upwardly therefrom and a pair of diagonal braces 13 extending between the upper end of the vertical support and the ends of the main beam 11.

Figure 10:
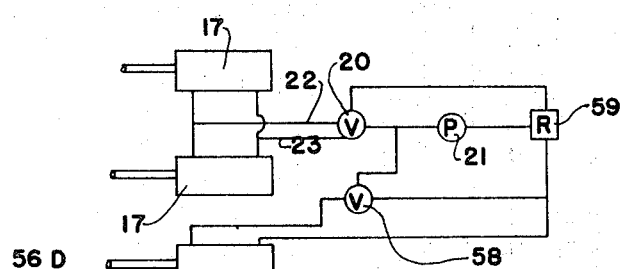
FIG. 10 is a schematic view of one design of hydraulics which may be utilized with this device.

Means are provided to attach this stationary component to a front end loader or the like and take the form of two pairs of lugs 14 secured to the rear side of the main beam 11 within which may engage the ends 15 of a pair of arms (one only of which is shown) of a front end loader or the like, it being understood that said arms are capable of raising and lowering and are operated from the front end loader or tractor as the case may be. The ends of the arms 15 are attached between the lugs 14 by means of pivot pins 16 and a pair of hydraulic piston and cylinder assemblies 17 extend between the arms 15 and a lug 18 extending upwardly upon each side of the main beam. Here again pivot pins 19 connect the ends of the piston rods to the lug 18. A four-way valve (shown schematically in FIG. 10) is identified by reference character 20 and is operatively connected to a hydraulic pump 21. Hydraulic lines 22 and 23 enable the fluid to be routed to either side of the pistons within the piston and cylinder assembly 17 so that the stationary component may be tilted forwardly and rearwardly within limits with reference to the arms 15 as well as being raised and lowered by the arms 15.

A movable component collectively designated 24 is substantially triangular in configuration and consists of a substantially horizontal main beam 25, a relatively long diagonal side 26 and a relatively short diagonal side 27. A vertical main brace or support 28 extends upwardly from intermediate the ends of the main beam 25 and is welded or otherwise secured to the diagonal side 26 spaced from the apex 29 of the triangular configuration formed by members 25, 26 and 27. Diagonal braces 30 extend between the main beam and the vertical support 28 and vertical members or braces 31 extend between the diagonals 30 and members 26 and 27 as clearly shown in FIG. 2.

Bale side engaging tines 32 extend forwardly from one side 33 of the movable member and further bale side engaging tines 33' extend forwardly from side 33, and from the members 26 and 27. The tines 32 are heavy-duty as they take the weight of the entire stook during transportation as will hereinafter be described.

A horizontally situated pivot 34 extends through the vertical support 12 of the stationary component 10 and the front component 24 is secured to the front end of this pivot. A crank arm 35 is secured to the rear end of pivot pin 34 and an hydraulic piston and cylinder assembly 36 is operatively connected between the distal end of the crank arm 35 and a stationary pivot point 37 on the vertical support 12 as shown in FIG. 1.

It will be observed that the configuration of the movable component 24 is such that it is offset with respect to the pivot 34 when in the normal position shown in FIG. 2 so that gravity will cause the movable component to swing downwardly to the position shown in FIG. 3 when the movable component is unlocked from the stationary component.

Figure 4:
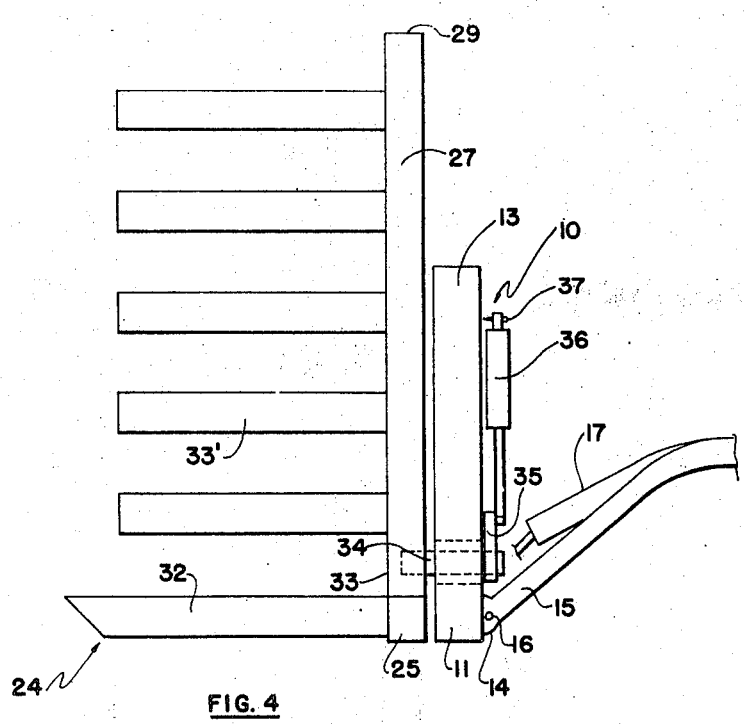
FIG. 4 is a side elevation of the device with the movable component in the normal position.

Means are provided to selectively and detachably lock the movable component in the normal position shown in FIGS. 2 and 4 and take the form of a first lock pin 38 journalled for endwise movement within a sleeve 39 welded to the side of the vertical support 12 of the stationary component. A release lever 40 is pivoted by one end to a pivot post 41 on the side of member 12 and a pivot 42 connects the lever 40 intermediate the ends thereof to the upper end of pin 38.

A tension spring 43 extends between the lever 40 and sleeve 39 and normally maintains pin 38 in the extended position.

A cable 44 extends from the other end 45 of the lever to adjacent the operator's position on the fork lift device (not illustrated) so that he may raise the lever thus withdrawing the pin 38 from the movable member 24.

In this regard, an apertured ramp 46 is secured to one side of the vertical member 28 and when the movable component is in the normal position, the pin 38 engages the aperture 47 within this apertured ramp.

It will therefore be appreciated that when the pin 38 is withdrawn, gravity will cause the movable component to swing downwardly in the direction of arrow 48, to the position shown in FIG. 3.

Figure 8:
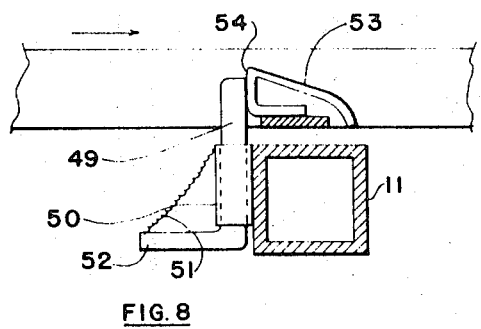
FIG. 8 is an enlarged partially sectioned fragmentary view substantially along the line 8—8 of FIG. 3.

Means are provided to retain the movable components 24 in the inverted position until it is desired to return it to the normal position and in this connection, reference should be made to FIG. 8. the A second lock pin 49 is mounted within a sleeve 50 secured to one side of the main beam 11 of the stationary component and a tension spring 51 reacting between the end 52 of th pin and the sleeve 50 normally maintains the pin in the extended position shown. A detent ramp 53 is secured to a cross member 54 which extends between a pair of members or braces 31 upon the movable component and as the component rotates to the position shown in FIG. 3, pin 49 rides up ramp 53 and the momentum of the movable component causes the ramp to pass the pin so that when it settles back to the position shown in FIG. 3, the pin engages the vertical detent portion 54 of the ramp 53.

OPERATION OF THE INVENTION

In operation, the device is normally in the position shown in FIG. 4.

It is moved to a stook of bales and is lowered to the ground so that when the device is moved forwardly, the tines 32 engage the corners 55 of the ground engaging bales of one stook specifically designated 56A.

Figure 9:
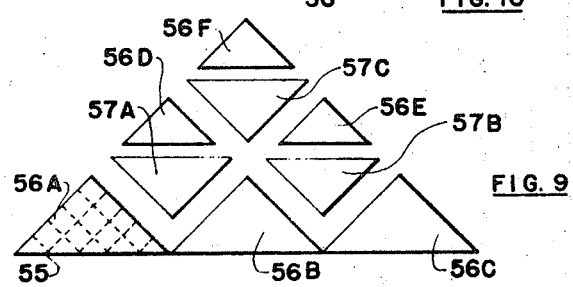
FIG. 9 is a schematic view showing the build up of stooks to make a stack.

The tines 33' on the members 26 and 27 engage the sides of the bales forming the stook 56A thus remaining the bales in the stook position when the arms 15 are raised to lift the entire assembly clear of the gound. The front end loader or the like is then moved to where it is desired to build the stack and the first stook 56A is lowered to the ground and the machine or device is withdrawn thus leaving it in the position shown in FIG. 9.

A second stook 56B is placed adjacent stook 56A and, if desired, further stooks 56C may also be positioned as illustrated. It should also be appreciated that although the individual stooks consist of a thickness of one bale, nevertheless four or five stooks can be placed one behind the other in positions 56A, 56B, 56C, etc.

When the next stook 57A is picked up by the device, it is raised clear of the ground whereupon the first lock pin 38 is withdrawn by lifting lever 40.

This causes gravity to rotate the movable component to the position shown in FIG. 3 thus inverting the stook. In this connection, a valve 58 is positioned so that the piston and cylinder assembly 36 is unloaded and any oil behind the piston is discharged into reservoir 59 so that this piston and cylinder assembly does not act as any resistance to the rotational action. When the movable device reaches the position shown in FIG. 3, it is locked in position by means of the detent ramp 54 and second lock pin 49 as hereinbefore described. The device is then moved into position so that stook 57A can be placed upside down between adjacent stooks 56A and 56B. A further inverted stook 57B is then placed between stooks 56B and 56C and two more normal stooks 56D and 56E are then positioned on top of these stooks 57A and 57B followed by a further inverted stook 57C and an upper stook 56F.

It will of course be appreciated that the stack can be extended at will within the lifting or elevational limits of the front end loader or the like.

When the inverter stook has been unloaded from the movable component, valve 58 is actuated so that hydraulic fluid withdraws the piston rod of the piston and cylinder assembly 36 thus causing the crank arm together with movable component to rotate through 180° in the same direction as arrow 48, until it reaches the normal position whereupon the first lock pin 38 rides up ramp 46 and engages aperture 47 thus locking it in position until it is required once again to invert a stook.

Additional ramp 47A extending upon the other side of vertical member 28 allows the lock pins to pass thereover during the rotational movement of the component 24 through the entire 360° range.

DESCRIPTION OF PREFERRED EMBODIMENT

Proceeding now to describe the preferred embodiment illustrated in FIGS. 11 to 13 inclusive, the crank arm 35 has the end of the piston rod 60 pivotally secured intermediate the ends thereof by pivot pin 61.

Also associated with the crank arm 35 is a bearing 62 which is secured to the sleeve 63 carrying the crank arm, said sleeve, of course, being freely pivoted upon the shaft 34.

An actuating rod 64 pivots within the bearing 62 and extends upwardly to a release lever assembly collectively designated 65 consisting of the main link 66 with the offstanding lug 67 formed upon one end thereof, said rod 64 engaging said lug as clearly shown in FIG. 12. This release lever assembly is pivoted to the vertical member 12 by means of pivot pin 68 and a release pin 69 is pivoted by one end thereof to the lever 66 and extends through the vertical member 12 which acts as a bearing with the end being engageable within an aperture 70 formed within the bale fork component 24 when same is in the position illustrated in FIG. 2. A tension spring 71 extends between the upper end of the lever 66 and a fixed point 72 normally biasing the release pin 69 into the engaged position shown in FIG. 12.

A multi-lobed cam plate collectively designated 73 is secured to the pivot shaft 34 by means of a shear pin 74 and rotates therewith.

In the present embodiment, three lobes namely 75A, 75B and 75C are provided each lobe consisting of a camming portion inclining outwardly from the main portion 76 as shown in FIG. 13.

A detent pin 77 is bearably supported within the distal end of the crank arm 35 and extends forwardly thereof being biassed in the forward position by means of a tension spring 78 reacting between the rear end 79 of the pin and a fixed point 80 forwardly thereof as shown in FIG. 12.

This means that the cam lobes 75A, B or C can pass the pin 77 moving same rearwardly against pressure of spring 78, when the cam plate 73 rotates in the direction of arrow 81, due to the fact that it is fixed to the same shaft as the stook fork assembly 24 and rotates therewith, it being understood that the stook fork assembly also swings in the direction of arrow 81 under the force of gravity when it is released, as explained in the previous embodiment.

However, the spring 78 urges the pin 77 forwardly as it is passed by each cam lobe 75A, B or C so that the cam plate cannot move in the opposite direction.

The sequence of operation is as follows, assuming that the fork assembly 24 is in the position shown in FIG. 2 and is loaded with stooks. When in this position, the crank arm 35 is in the position shown in phantom in FIG. 11 and the release pin 69 is holding the stook carrier 24 with the base in the horizontal position.

At this point the piston and cylinder assembly 36 is not quite fully retracted and the sleeve or bushing 62 is in the position shown by reference character 62A in FIG. 11.

The piston and cylinder assembly is then fully retracted moving the sleeve or bushing 62 to the position indicated by reference character 62B. This has the effect of moving rod 64 downwardly in the direction of arrow 82 which effectively withdraws the release pin 69 from the carrier thus allowing gravity to move it through approximately 180° in the direction of arrow 81. If the carrier shows a tendency not to rotate initially, the piston and cylinder can be extended slightly so that the pin 77 which engages dog or cam lobe 75B, can give the carrier a slight nudge in order to start it moving by gravity. The carrier may not turn through a full 180° so that the piston and cylinder assembly can be further extended whereupon pin 77 engages behind the cam lobe 75A and rotates the carrier to the fully inverted position shown in FIG. 3. The stook may then be placed as hereinbefore described and the assembly withdrawn from the stooks.

The hydraulic piston and cylinder assembly is then retracted so that pin 77 engages the cam lobe 75C on the rear side thereof. The ram is then extended so that the pin engaging the rear of 75C, rotates the cam plate 73 together with the carrier 24 through approximately 90° at which time gravity and inertia will enable the carrier to return to the original position shown in FIG. 2 checked by the engagement of the rear side of the cam lobe 75B against pin 77.

A camming surface (not illustrated) is provided to enable release pin 69 to retract and then engage by means of spring 71 thus holding the carrier in the original position.

If desired, a fourth cam lobe shown in phantom by reference character 75D may be provided diametrically opposite to cam lobe 75A. This can be used to enable the device to engage a stook which is inverted, a situation often required when unloading a stack.

It will therefore be appreciated that by the provision of a cam lobe plate 73 and a simple double acting piston and cylinder assembly 36, the device is fully maneuverable in the raising and lowering positions although the main turning effort to the unloading or inverted position is by gravity as in the previous embodiment.

Various modifications may be constructed or performed within the scope of the inventive concept disclosed. Therefore what has been set forth is intended to illustrate such concept and is not for the purpose of limiting protection to any herein particularly described embodiment thereof.

What I claim as my invention is:

1. A device for inverting a stook adapted to be used with a fork loader or the like, said stook comprising a plurality of bales nested together to form a triangle whereby said stook may be nested upside down between a pair of adjacent normally positioned stooks; said device including a stationary component and a movable component journalled to said stationary component for rotation in a substantially vertical plane, said movable component including a substantially triangular frame and bale side engaging tines extending at right angles from one side of said frame, means mounting said movable component to said stationary component as aforesaid, said means including a pivot extending from said movable component and engaging said stationary component thereby bearably supporting said movable component for rotation on said stationary component, said pivot being positioned whereby said movable component is offset when in the normal position, means to selectively and detachably lock said movable component in the normal position against gravitational rotation to the inverted position, means to retain said movable component in the inverted position and means to rotate said movable component from the inverted position to the normal position, said last mentioned means including a crank arm secured by one end thereof to said pivot and piston and cylinder means operatively connecting between said crank arm and said stationary component, and a multilobed cam plate secured to and rotatable with said pivot, and spring loaded detent means on said crank arm engageable by the lobes of said cam plate.

2. The device according to claim 1 in which said means to selectively and detachably lock said movable component in the normal position includes a spring loaded lock pin on said stationary component, means on said movable component engageable by said lock pin when said movable component is in the normal position, and means operatively connecting between said lock pin and said crank arm to withdraw said lock pin from engagement with said movable component when said piston and cylinder component is fully retracted.

3. The device according to claim 2 in which said spring loaded detent means includes a detent pin mounted for endwise movement in the outer end of said crank arm, and spring means normally biassing said detent pin forwardly towards said cam plate, said cam plate including a plurality of arms extending radially therefrom and a camming portion extending outwardly from the outer end of each of said arms, said detent pin being retracted by said camming portion when said detent pin and said camming portion move relative to one another in one direction, said pin being engaged by said camming portion when said detent pin and said camming portion move relative to one another but in the opposite direction.

4. The device according to claim 2 in which said last mentioned means includes a release lever assembly pivotally secured to said stationary component, one end of said lock pin being pivotally attached to one end of said lever assembly, a lug offstanding from the other end of said lever assembly and a rod pivotally attached by one end thereof to said lug and by the other end thereof to said crank arm adjacent the inner end thereof.

5. The device according to claim 4 in which said spring loaded detent means includes a detent pin mounted for endwise movement in the outer end of said crank arm, and spring means normally biassing said detent pin forwardly towards said cam plate, said cam plate including a plurality of arms extending radially therefrom and a camming portion extending outwardly from the outer end of each of said arms, said detent pin being retracted by said camming portion when said detent pin and said camming portion move relative to one another in one direction, said pin being engaged by said camming portion when said detent pin and said camming portion move relative to one another but in the opposite direction.

6. The device according to claim 1 in which said spring loaded detent means includes a detent pin mounted for endwise movement in the outer end of said crank arm, and spring means normally biassing said detent pin forwardly towards said cam plate, said cam plate including a plurality of arms extending radially therefrom and a camming portion extending outwardly from the outer end of each of said arms, said detent pin being retracted by said camming portion when said detent pin and said camming portion move relative to one another in one direction, said pin being engaged by said camming portion when said detent pin and said camming portion move relative to one another but in the opposite direction.

* * * * *